DESIGN.

No. 11,771. Reissued Sept. 5, 1899.

L. T. SNOW.

CASE FOR FOOD CHOPPERS.

(Application filed July 24, 1899.)

Witnesses
J. H. Shumway
Lillian D. Kelsey

Levi T. Snow.
Inventor.
By attys Seymour & Earle

UNITED STATES PATENT OFFICE.

LEVI T. SNOW, OF NEW HAVEN, CONNECTICUT.

DESIGN FOR A CASE FOR FOOD-CHOPPERS.

SPECIFICATION forming part of Reissued Design No. 11,771, dated September 5, 1899.

Original No. 30,580, dated April 18, 1899. Application for reissue filed July 24, 1899. Serial No. 724,920.

*To all whom it may concern:*

Be it known that I, LEVI T. SNOW, of New Haven, in the county of New Haven and State of Connecticut, have invented and produced a new Design for a Case for Food-Choppers; and I do hereby declare the following, when taken in connection with the accompanying drawings and the letters of reference marked thereon, to be a full, clear, and exact description of the same, and which said drawings constitute part of this specification, and represent, in—

Figure 1:
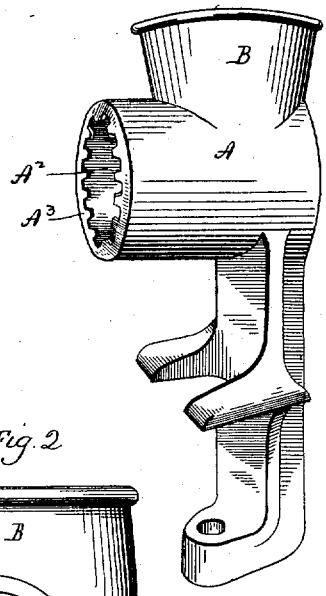
Figure 2:
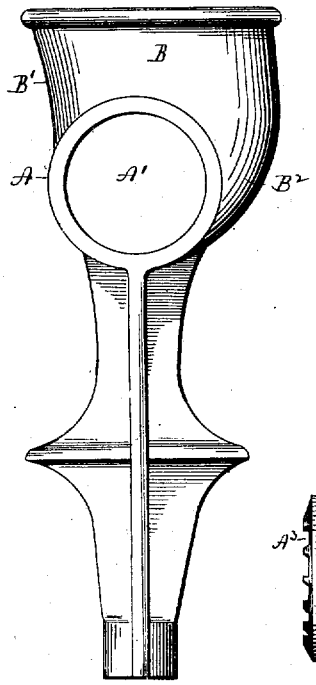
Figure 3:
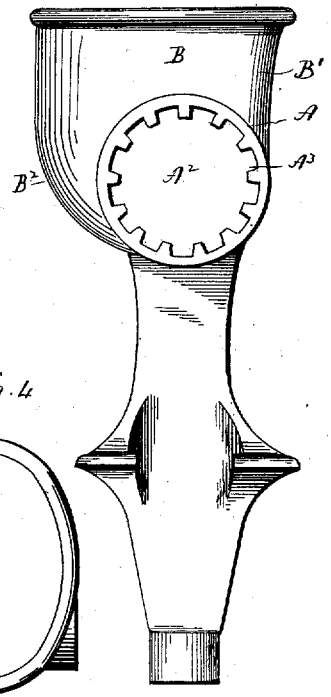
Figure 4:
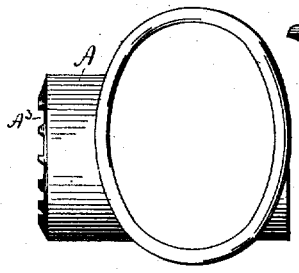

Figure 1, a perspective view of a food-chopper case containing my design; Fig. 2, a rear view thereof; Fig. 3, a front view thereof; Fig. 4, a plan view thereof.

My invention relates to a design for a case for food-choppers; and it consists in the configuration herein shown and described.

The relatively short horizontally-arranged cylindrical body A of the case is surmounted by a hopper B, located at its rear end. One side of the hopper is curved upward and outward from the adjacent side of the body, as at B′, while the other side of the hopper bulges out, as at $B^2$, beyond the plane of the said body, which it may be said to overhang.

The body is formed with a circular opening A′ at its inner end and at its outer end with a circular opening $A^2$, surrounded by smaller openings or spaces $A^3$. From the said body A depends a stem or standard; but the essential feature of my design resides in the configuration of the body and hopper.

Having described my invention, what I claim as new, and desire to secure by Letters Patent, is—

The design herein shown and described, for a case for a food-chopper.

In testimony whereof I have signed this specification in the presence of two subscribing witnesses.

LEVI T. SNOW.

Witnesses:

FRED. C. EARLE,

GEORGE D. SEYMOUR.